United States Patent
Moetteli

[19]

[11] Patent Number: 6,036,310
[45] Date of Patent: Mar. 14, 2000

[54] EYEGLASSES WITH INFINITELY VARIABLE TEMPLE ADJUSTMENT

[76] Inventor: John B. Moetteli, 14, Ave. Ernest-Pictet, CH-1203 Geneva, Switzerland

[21] Appl. No.: 09/265,790

[22] Filed: Mar. 10, 1999

Related U.S. Application Data

[60] Provisional application No. 60/078,078, Mar. 13, 1998.
[51] Int. Cl.[7] ........................................................ G02C 5/20
[52] U.S. Cl. .............................. 351/118; 351/51; 351/157
[58] Field of Search .................................. 351/111, 114, 351/118, 157, 51, 52

[56] References Cited

U.S. PATENT DOCUMENTS 4,799,782  1/1989  Tuttle ........................................ 351/118

FOREIGN PATENT DOCUMENTS

| | | |
|---|---|---|
| 0100392 | 2/1984 | European Pat. Off. . |
| 0698801 | 2/1996 | European Pat. Off. . |
| 2737583 | 2/1997 | France . |
| 3816481 | 11/1989 | Germany . |
| 9420185 U | 2/1995 | Germany . |

*Primary Examiner*—Huy Mai
*Attorney, Agent, or Firm*—John Moetteli

[57] ABSTRACT

A pair of eyeglass frames are provided having two wrap-around temple portions, and a temple-portion adjustment mechanism. The two wrap-around temple portions pivotally attach to the frame. Each wrap-around temple portion includes a substantially straight portion and a resilient, wrap-around portion connected thereto. The curved portion has a bias to wrap around a wearer's ear. The temple-portion adjustment mechanism includes a beam which may rigidize a selected length of the corresponding wrap-around temple portion. The wearer selects the length rigidized by sliding the beam along an axis of the straight portion. Sliding the beam in a first axial direction draws a length of the wrap-around portion into engagement with the beam and counteracts the bias in the curved portion. This straightens and rigidly supports the selected length of the curved portion.

24 Claims, 6 Drawing Sheets

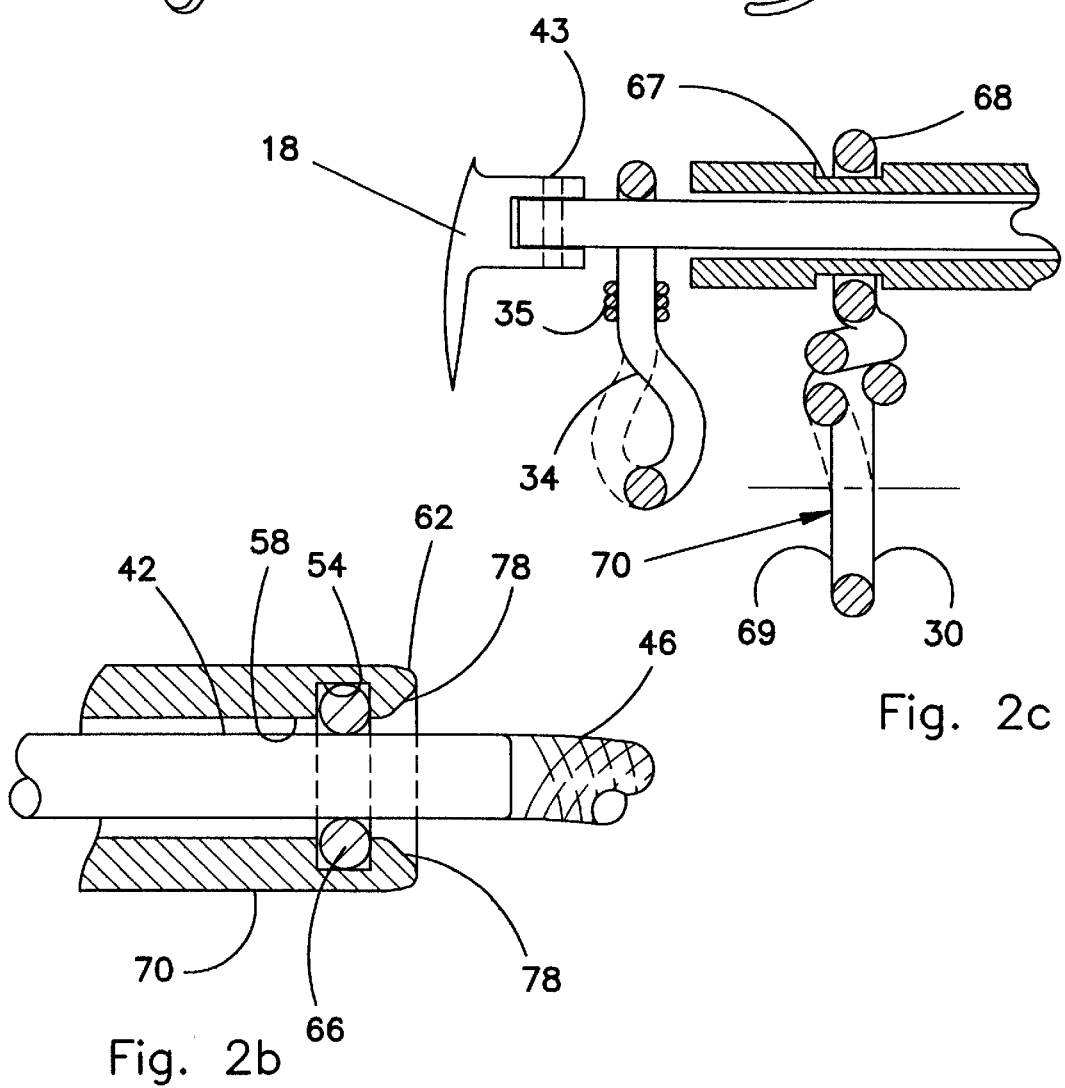

6,036,310

EYEGLASSES WITH INFINITELY VARIABLE TEMPLE ADJUSTMENT

This Application claims the benefit of U.S. Provisional Application No. 60/078,078 filed Mar. 13, 1998.

TECHNICAL FIELD

This invention relates generally to frames for eyewear, and more particularly to means for providing adjustability to the temple portion of frames for eyewear for comfort and for secure mounting of the eyewear to the user's head.

BACKGROUND

The human head being an organic appendage, varies significantly in size and shape, thus making it difficult to design eyewear which may accommodate a wide cross section of the population. One method which has been designed to accommodate a wide cross section is that originally made for the military. "RAY-BAN AVIATOR" sunglasses, made by Bausch and Lomb, Inc. are an example. Bausch and Lomb, Inc. manufacturers standard glasses having a simple frame comprised of wrap-around temple portions. Each wrap-around temple portion includes a substantially straight portion and a flexible, wrap-around, curved portion. One end of the straight portion pivotally connects, via a hinged end, to the lens frame. At another end of the straight portion, the flexible, curved portion attaches. The curved portion curves downward such that when the eyewear is worn, the ends of the wrap-around portion wraps around the ear securely holding the eyewear in place. The curved portion is made of a resilient flexible material which has a memory that causes it to bias to its original, most tightly curved position when removed from the wearer.

This wrap-around system has proven durable, and effective to securely hold the eyewear in place during the frequent quick side-to-side, up-and-down (and combinations thereof) movements of the head typically required military observation or combat, and, of course, during sporting activity. However, at least one significant disadvantage exists. The wrap-around portions tend to wear into the flesh of the wearer's ear, causing discomfort, pain and general annoyance. Proper initial fitting may help alleviate these problems, but cannot accommodate the variety of wearers which may borrow the same pair of eyewear, common with nonprescription sunglasses, for example. Initial fitting for comfort does not usually result in the highest curvature, desirable when highly active sports are engaged in—a situation in which the user desires the maximum holding power. When the eyewear is fit, the temples are usually expanded and the curvature of the curved portion reduced in order to relieve the chaffing pressure on the ears. The maximum holding ability, which is lost upon initial adjustment and fitting, cannot be regained without completely refitting the eyewear. This can be time consuming, inconvenient and may also result in premature failure of the temple portions due to excessive fatigue brought on by repeated cycles of adjustment.

Attempts have been made to improve adjustability and alleviate the discomfort associated with wrap-around temple portions, but these have discarded the early wrap-around temple portions in favor of more complicated but more readily adjustable methods. Such alternative methods depart from the "authentic military" design of early sunglasses.

Further, "RAY-BAN AVIATOR"-type glasses with flexible, curved portions cannot be used with a full face motorcycle helmet. This is because the extremely flexible curved portions of the temple portions cannot be wrapped around the ears unless adequate access is provided such that the fingers of the hand are free to guide the curved portions around the ears. No full-face motorcycle helmet provides such access.

A need therefore exists for a means to provide adjustability to the more conventional wrap-around type temple portion (e.g., "RAY-BAN AVIATOR"-type temple portions) which can be made at minimal cost and yet provide for nearly infinite variability of the effective length and curvature of the temple portions, as well as permit use in full-face motorcycle helmets.

SUMMARY

A pair of eyeglass frames are provided having two wrap-around temple portions, and a temple-portion adjustment mechanism. The two wrap-around temple portions pivotally attach to the frame. Each wrap-around temple portion includes a substantially straight portion and a resilient, curved portion connected thereto. The curved portion has a bias to wrap around a wearer's ear.

The temple-portion adjustment mechanism includes a structural beam which may rigidize a selected length of the corresponding wrap-around temple portion. The wearer selects the length rigidized by sliding the structural beam along an axis of the straight portion. Sliding the structural beam in a first axial direction draws a length of the wrap-around portion into engagement with the structural beam and counteracts the bias in the wrap-around portion. This straightens and rigidly supports the length so drawn into the structural beam. Sliding the structural beam in a second direction releases a length of the curved portion from the structural beam. This allows the length to increase its curvature and to relieve the bias in the curved portion.

In one feature, the selected length of the wrap-around portion which the structural beam rigidizes varies from zero to a substantial portion of the length of the wrap-around portion.

In another feature, the structural beam is a tube which slides along the wrap-around temple portion.

In another feature, the tube is a metal tube which has an internal recess disposed in an internal diameter near an end of the tube, the internal recess receiving art o-ring.

In another feature, an end of the structural beam by which the curved portion is rigidized, has an internal taper.

In another feature, the structural beam is made of a florescent plastic.

In another feature, the structural beam is a color anodized aluminum tube and, optionally, includes a decorative pattern formed thereon.

In another feature, the beam includes a camouflage-colored exterior.

In another feature, the structural beam is made of a transparent plastic.

In another feature, the structural beam is a brass tube having a mat finish into which a decorative, reflective pattern is carved.

In another feature, the structural beam has a knurled external surface.

In another feature, the wrap-around temple portions have stops near their ends. The stops prevent the structural beam from sliding off the wrap-around temple portions.

In another feature, the structural beams are connected with a strap.

In another feature, a strap passes through each structural beam, adjacent the wrap-around temple portion, and connects to the eyeglasses.

In another feature, each structural beam comprises at least two apertures, one of the apertures receiving the wrap-around temple portion, and the other receiving the strap.

An object of the present invention is to provide eyeglasses which securely fit a wearer when desired, and fit comfortably when secure fitting is not as important as comfort.

Another object of the present invention is to minimize chaffing of the eyeglasses into the flesh of the wearer's ear, thus minimizing discomfort, pain and general annoyance.

Another object is to provide wrap-around temple portion eyeglasses which may be used with a full-face motorcycle helmet.

Another object is to provide an inexpensive, highly adjustable temple adjustment mechanism.

BRIEF DESCRIPTION OF THE DRAWINGS

Other objects and advantages of this invention will become readily apparent as the same is better understood by reference to the following detailed description when considered in connection with the accompanying drawings wherein:

FIG. 2a is a partial cross-section, side view of the preferred embodiment of the present invention;

FIGS. 2b and 2c are detailed view of the region identified by numeral 2b and 2c in FIG. 1;

DETAILED DESCRIPTION OF THE PREFERRED EMBODIMENT

Figure 1:
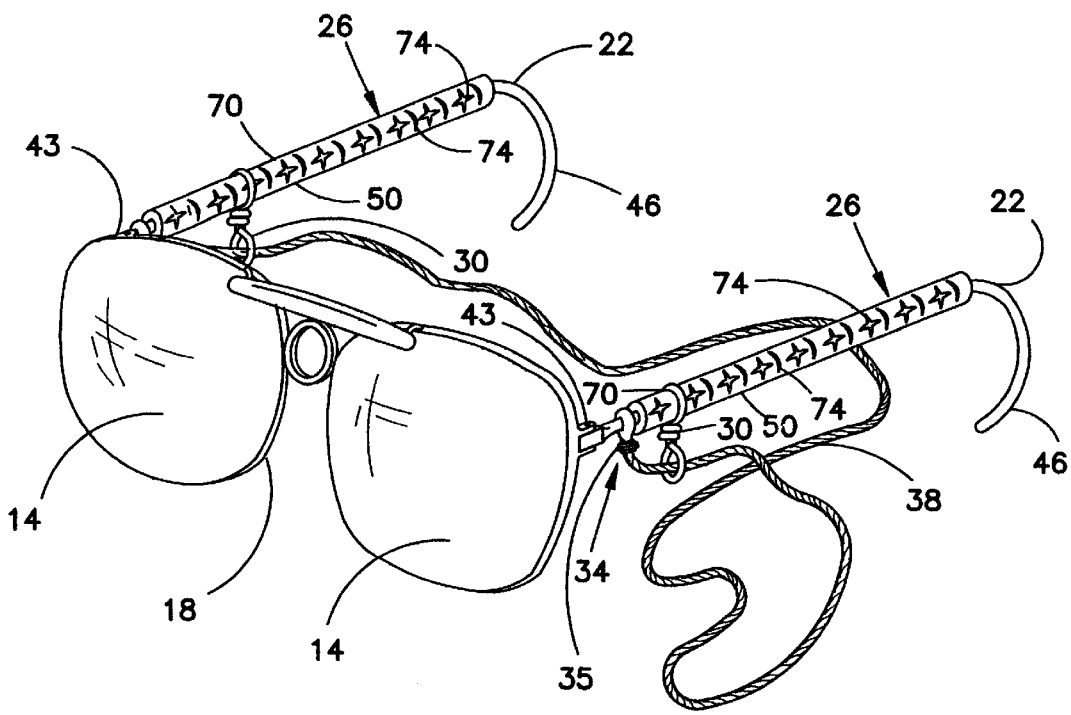
FIG. 1 is a perspective view of the preferred embodiment of the present invention.

Referring now to the drawings wherein is shown a preferred embodiment and wherein like reference numerals designate like elements throughout the several views, there is shown in FIG. 1 a perspective view of eyeglasses 10 having lenses 14, a frame 18 securing the lenses, two wrap-around or cable-type temple portions 22, a temple-portion adjustment mechanism 26, retainers 30, clasps 34 attached to a forward part of the wrap-around temple portions, and a chain or strap 38 attached to the clasps. The wrap-around temple portion 22 pivotally attaches to the frame 18. Each wrap-around temple portion 22 has a length including a straight portion 42 (shown in FIGS. 2b and 2c) and a resilient, curved portion 46 connected thereto. The temple-portion adjustment mechanism 26 includes a structural beam 50 which is adapted to rigidize a selected length of the wrap-around temple portion 22.

Referring to FIG. 2a, the structural beam 50 is a tube which slides along the wrap-around temple portion 22.

Referring now to FIG. 2b, the tube has an annular internal recess 54 disposed in an internal diameter 58 near an end 62 of the tube. The internal recess 54 receives an o-ring 66.

Referring again to FIG. 1, the structural beam 42 is made of brass. The external surface 70 of the structural beam is processed to have a dull, mat finish. An artisan carves sharp, highly reflective facets 74 into the tube, giving the eyeglasses a pleasing, decorative pattern which provides a suitable gripping surface for the wearer.

Referring again to FIG. 2b, the end 62 of the structural beam 50, by which the curved portion 46 is rigidized, has an annular internal taper 78.

Figure 3A:
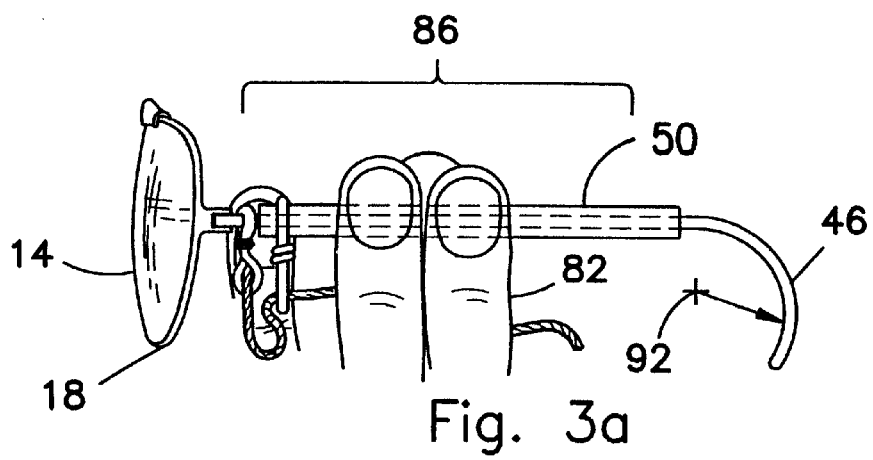
FIGS. 3a–3c are progressive side views of the preferred embodiment of the present invention.
Figure 3B:
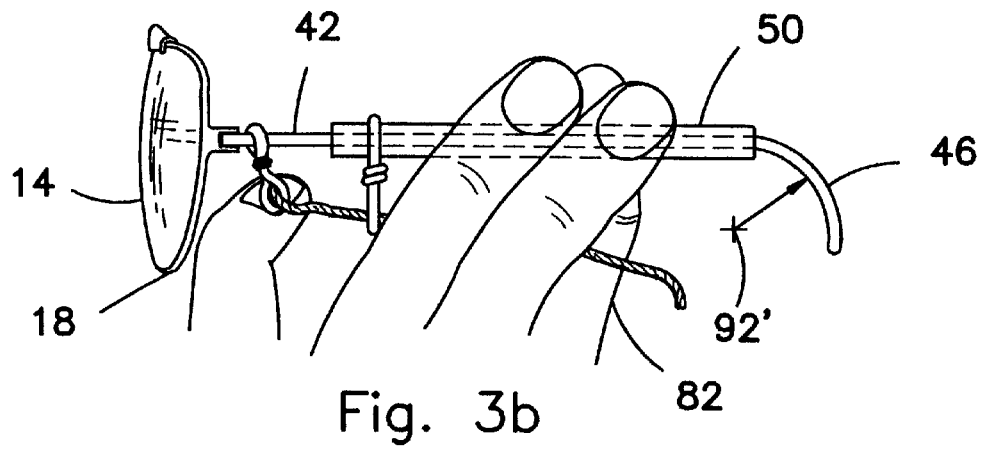
Figure 3C:
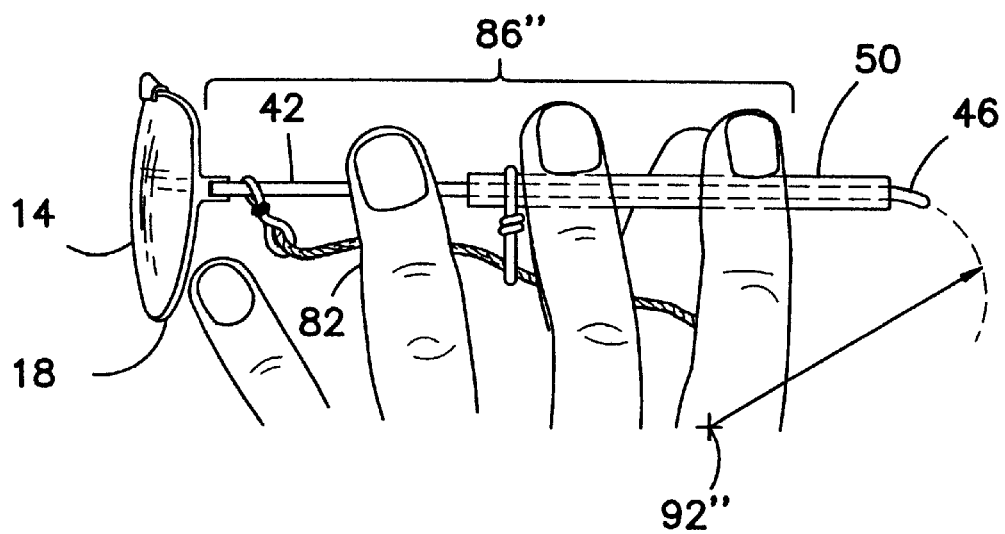

Referring to FIGS. 3a to 3c, in operation, a wearer adjusts the length and curvature of the wrap-around temple portion 22 by using his fingers 82 to slide the structural beam 50 along the length of the straight portion 42. FIGS. 3a to 3c show a progression and the corresponding changes which occur to the length of a straight portion 86 (compare with 86"). This action concurrently rigidizes a selected amount of the curved portion 46, drawing the amount rigidized into engagement with the structural beam 50, thus changing the curvature of the curved portion 46. Note the center of curvature 92 of the curved portion 46 as its position changes to 92' and 92". The drawing action counteracts a biasing force in the curved portion 46 to wrap-around the wearers ear (not shown). The drawing also selectively imparts rigidity from the structural beam 50 to the amount of the curved portion 46, rigidized with the structural beam. The taper 78 minimizes wear on, and permits smooth drawing of, the curved portion 46 into the structural beam 50. Friction between the structural beam 50 and the wrap-around temple portion 22 is sufficient to maintain the structural beam 50 is a selected portion when the fingers 82 are released. The friction is increased by the o-ring 66.

As is apparent from the figures, the selected length of the curved portion 46 which the structural beam 50 rigidizes varies from zero to a substantial portion of the length of the curved portion. The stops 30 help prevent the structural beam 50 from sliding off the wrap-around temple portions 22, and if they do, the stops prevent loss of the structural beams.

In an alternate embodiment, the structural beam 50 has a knurled external surface.

In another alternate embodiment, the structural beam 50 is a color anodized aluminum tube and, optionally, includes a decorative pattern formed thereon.

Figure 4:
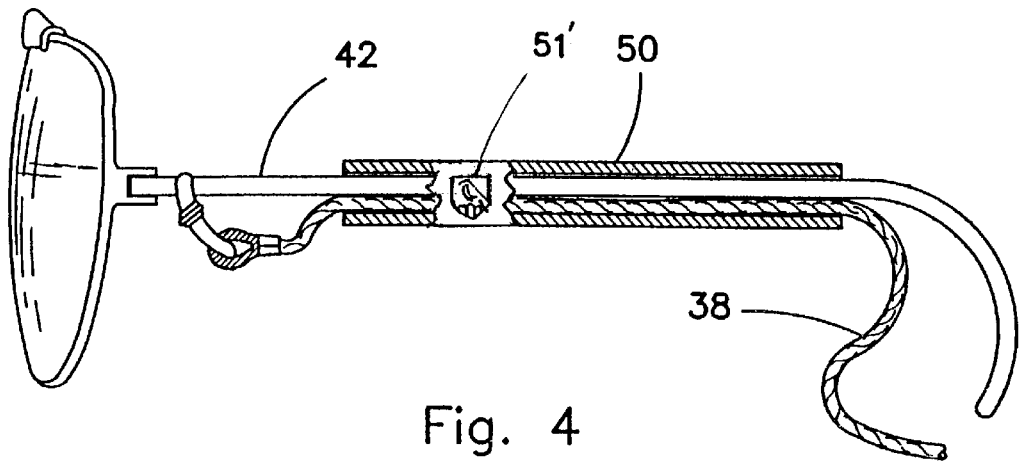
FIG. 4 is a partial cross-section, side view of an alternate embodiment of the present invention.

In another alternate embodiment shown in FIG. 4, the structural beam 50 is laser etched with a company logo 51' or other promotional symbol.

Figure 5:
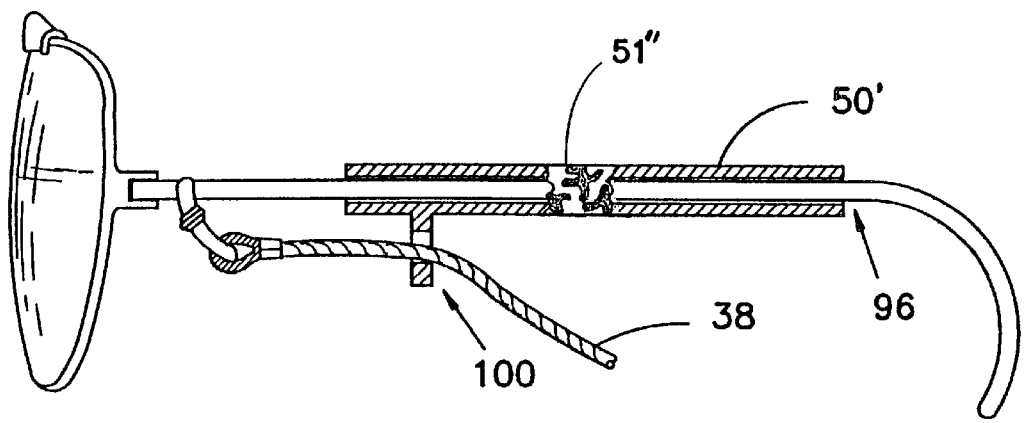
FIG. 5 is a partial cross-section, side view of an alternate embodiment of the present invention.

In another alternate embodiment shown in FIG. 5, the beam 50 includes a camouflage-colored exterior 51".

In another alternate embodiment, the structural beam 50 is made of a florescent plastic.

In another alternate embodiment, the structural beam 50 is made of a transparent plastic.

In another alternate embodiment, depicted in FIG. 4, the strap 38 passes through each structural beam 50, adjacent the wrap-around temple portion 22, and connects to the eyeglasses 10.

In another alternate embodiment, depicted in FIG. 5, each structural beam 50' comprises at least two apertures 96 and 100, one of the apertures 96 receiving the wrap-around temple portion 22, and the other receiving the strap 30. The aperture 100 may be a ring or clasp attached to the structural beam 50.

Figure 6:
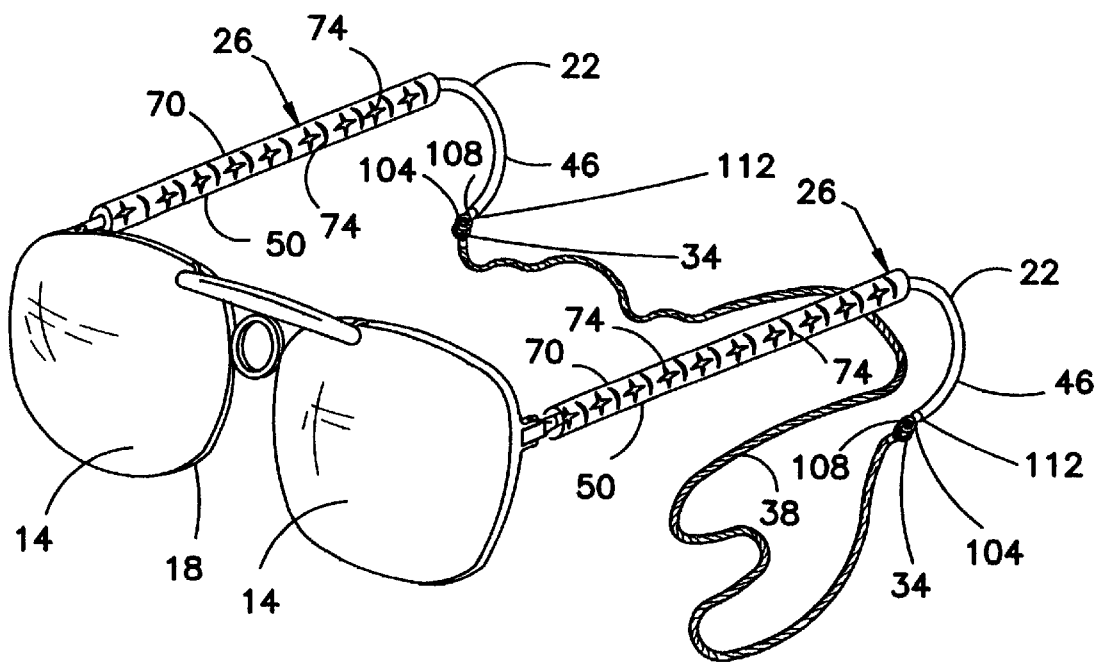
FIG. 6 is a perspective view of an alternate embodiment of the present invention.

In FIG. 6, the straps 38 attach to eyelets 104 inserted into ends 112 of the curved portion 46 via rings 34'. The rings 34' are sized to act as stops, preventing the structural beams 50 from sliding off the temple portion 22.

An advantage of the present invention is that eyeglasses 10 are provided which more securely fit a wearer when desired, and fit less securely, but more comfortably when secure fitting is not as important as comfort.

Another advantage of the present invention is that it minimizes chaffing into the flesh of the wearer's ear. This minimizes discomfort, pain and general annoyance.

Another advantage is the eyeglasses 10 may be used with a full-face motorcycle helmet. To do so, the structural beams 50 are extended such that the length of the wrap-around temple portions 22 are at a maximum, and the curvature of the curved portion 46 is at a minimum, as shown in FIG. 3b. This then permits a user to push each temple portion over the top of his ear, through the visor opening in the full-face motorcycle helmet, and then retract the structural beam 50, thus concurrently increasing the curvature of the curved portion 46 and wrapping it around his ear until it is sufficiently snug.

Another advantage is the eyeglasses 10 provide an inexpensive, highly adjustable and fashionable temple adjustment mechanism 26.

Figure 7:
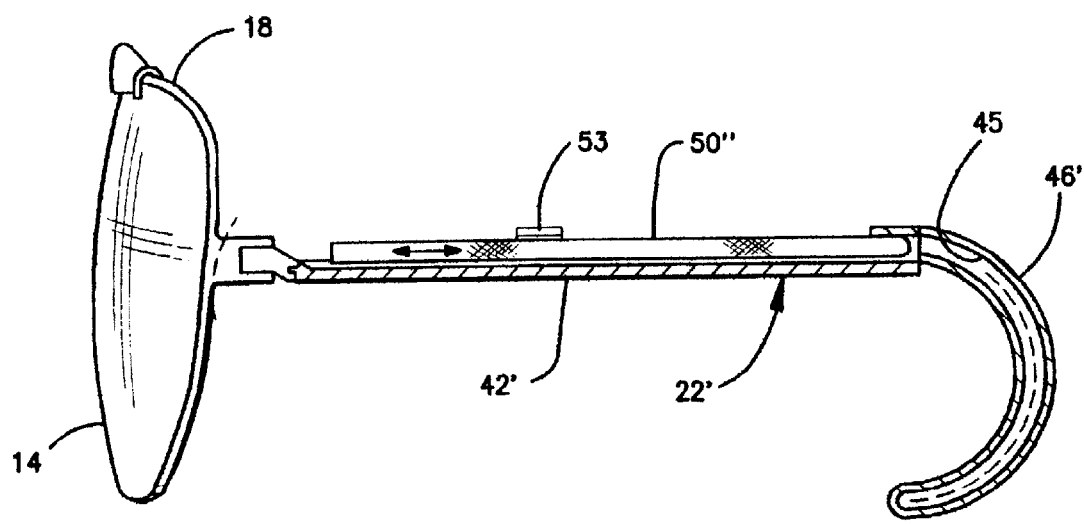
FIG. 7 is a partial cross-section, side view of an alternate embodiment of the invention.

It should be understood that the foregoing disclosure relates to only a preferred embodiment of the invention. The patent claims are intended to cover all changes and modifications to features of the invention which may reasonably be considered equivalent to those specific examples herein disclosed, such as that of FIG. 7, showing the use of a solid beam 50", slideable along the length of the straight portion 42' and retained thereagainst by a retainer 53, an end of the beam capable of entering an inside surface 45 of a hollow curved portion 46', thereby rigidizing the curved portion in a similar manner to a hand entering a glove. The curved portion 46', however, has a level of rigidity, permitting the retaining of the glasses 10 against the users face regardless of how much of the beam 50" enters inside it. Such changes fall within the spirit and scope of the invention as set forth in the claims.

I claim:

1. Eyeglass frames having a temple-portion adjustment mechanism, the frames comprising:
    two wrap-around temple portions each including a substantially straight portion and a resilient, curved portion; and
    two beams, each beam capable of rigidizing a selected length of the curved portion, the selection of the length rigidized accomplished by sliding the curved portion into or out of engagement with the beam, thereby adjusting the shape of the curved portion.

2. The frames of claim 1 wherein:
    (1) sliding the beam in a first axial direction draws a length of the wrap-around portion into engagement with the beam and counteracts a bias in the resilient, curved portion, thereby straightening and rigidly supporting the length so drawn in the beam, and
    (2) sliding the beam in a second direction releases a length of the resilient, curved portion from the beam, thereby allowing the length to increase its curvature and to relieve the bias in the curved portion.

3. The frames of claim 1, wherein the selected length of the curved portion which the beam rigidizes varies from zero to a substantial portion of the length of the curved portion.

4. The frames of claim 1, wherein the beam is a tube which slides over and along the wrap-around temple portion.

5. The frames of claim 4, wherein the tube is a metal tube which has an internal recess disposed in an internal diameter near an end of the tube, the internal recess receiving an o-ring.

6. The frames of claim 1 wherein an end of the beam by which a length of the curved portion is rigidized, has an internal taper.

7. The frames of claim 1, wherein the beam is made of a florescent plastic.

8. The frames of claim 1, wherein the beam is made of a transparent plastic.

9. The frames of claim 1, wherein the beam is a brass tube.

10. The frames of claim 1, having a finish into which a decorative pattern is formed.

11. The frames of claim 1, wherein the beam has a knurled external surface.

12. The frames of claim 1, wherein the wrap-around temple portions have stops near there ends, the stops preventing the beam from sliding off the wrap-around temple portions.

13. The frames of claim 1, wherein the beams are connected with a strap.

14. The frames of claim 1, wherein a strap passes through each beam, adjacent the wrap-around temple portion, and connects to the frames.

15. The frames of claim 1, wherein each beam comprises at least two apertures, one of the apertures receiving the wrap-around temple portion, and the other receiving the strap.

16. A temple-portion adjustment mechanism for eyeglass frames, the frames having a wrap-around temple portion including a substantially straight portion and a resilient, curved portion connected thereto, the curved portion having a bias to wrap around a wearer's ear; and
    two beams, each beam capable of rigidizing a selected length of the corresponding wrap-around temple portion, the selection of the length rigidized accomplished by sliding the curved portion into or out of engagement with the beam.

17. The temple-portion adjustment mechanism of claim 16 wherein:
    (1) sliding the beam in a first axial direction draws a length of the curved portion into engagement with the beam and counteracts the bias in the curved portion, thereby straightening and rigidly supporting the length so drawn in the beam, and
    (2) sliding the beam in a second direction releases a length of the curved portion from the beam, thereby allowing the length to increase its curvature and to relieve the bias in the curved portion.

18. The temple-portion adjustment mechanism of claim 16, wherein the selected length of the curved portion which the beam rigidizes varies from zero to a substantial portion of the length of the curved portion.

19. The temple-portion adjustment mechanism of claim 16, wherein the beam is a tube which slides along the wrap-around temple portion.

20. The temple-portion adjustment mechanism of claim 19, wherein the tube is a metal tube which has an internal recess disposed in an internal diameter near an end of the tube, the internal recess receiving an o-ring.

21. The temple-portion adjustment mechanism of claim 16 wherein an end of the beam has an internal taper.

22. The temple-portion adjustment mechanism of claim 16 wherein the beam is etched with a promotional symbol.

23. The temple-portion adjustment mechanism of claim 16, wherein the beam is made of a florescent plastic.

24. The temple-portion adjustment mechanism of claim 16, wherein the beam is made of a transparent plastic.

* * * * *